Figure 12:
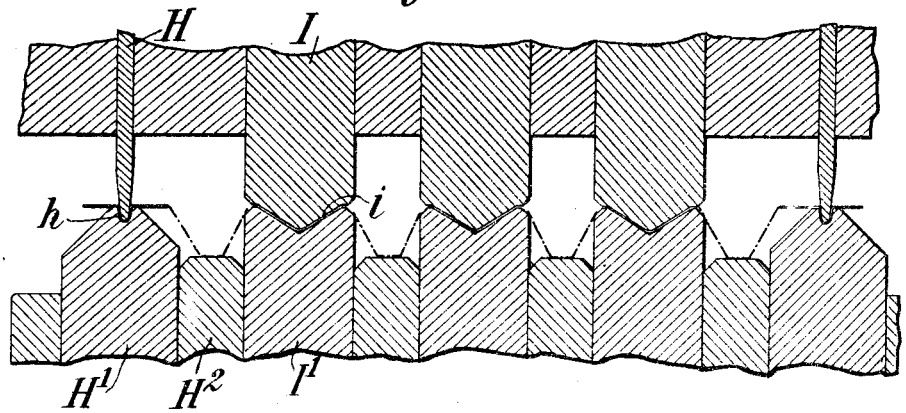
Figure 13:
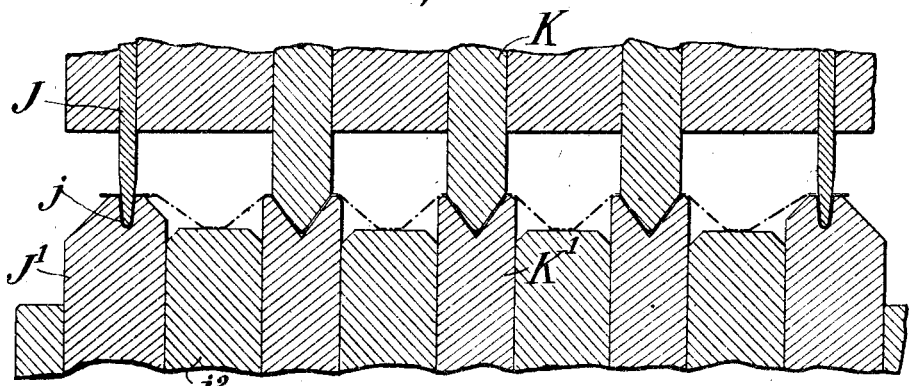

J. E. DOBSON & G. MERKEL.
MACHINE FOR PRODUCING EXPANDED METAL.
APPLICATION FILED DEC. 6, 1912.
1,119,933.
Patented Dec. 8, 1914.
7 SHEETS—SHEET 1.
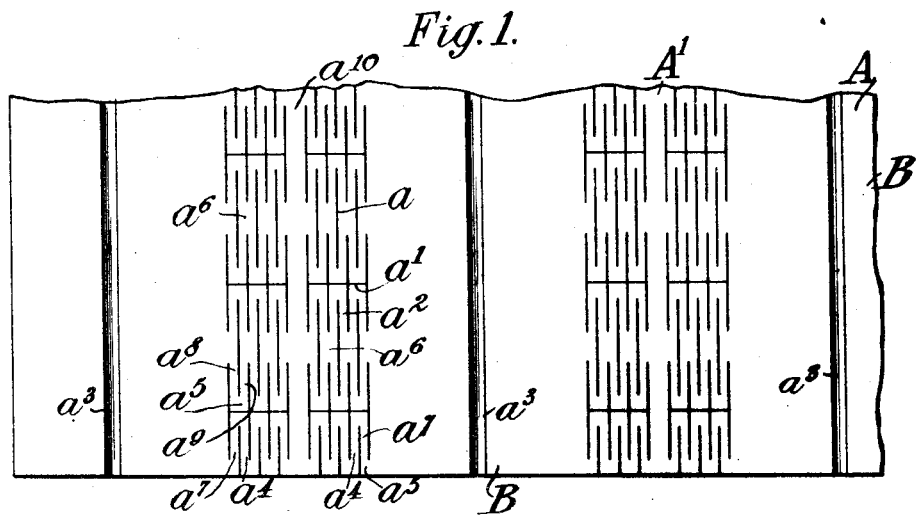
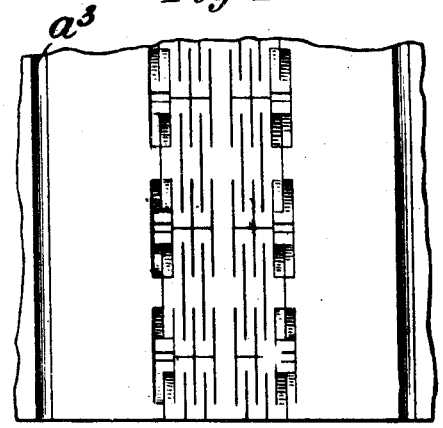
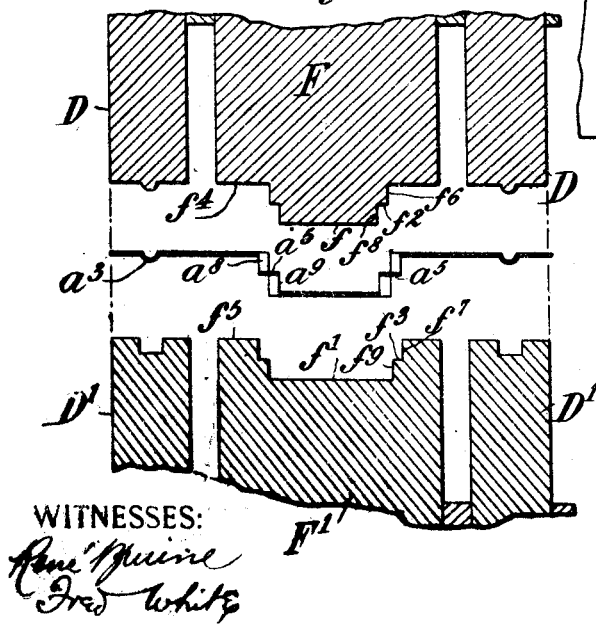
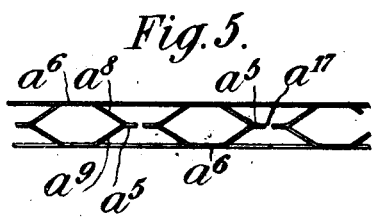
WITNESSES:
INVENTORS
John E. Dobson,
Georg Merkel,
By Attorneys, J. E. DOBSON & G. MERKEL.
MACHINE FOR PRODUCING EXPANDED METAL.
APPLICATION FILED DEC. 6, 1912.
1,119,933.
Patented Dec. 8, 1914.
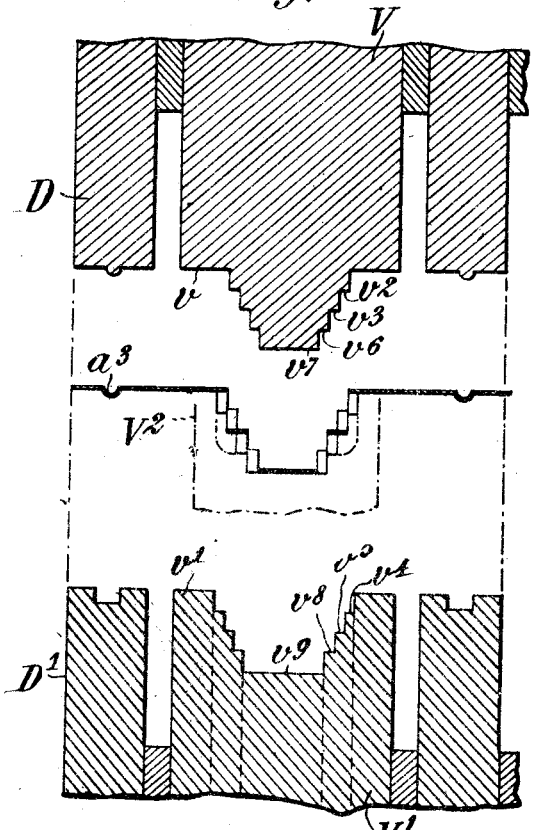
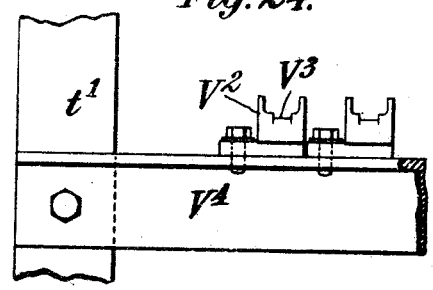
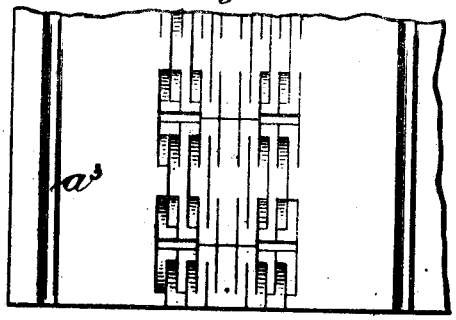
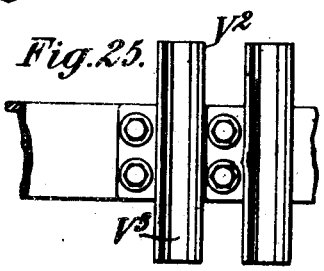

J. E. DOBSON & G. MERKEL.
MACHINE FOR PRODUCING EXPANDED METAL.
APPLICATION FILED DEC. 6, 1912.
1,119,933.
Patented Dec. 8, 1914.
7 SHEETS—SHEET 3.
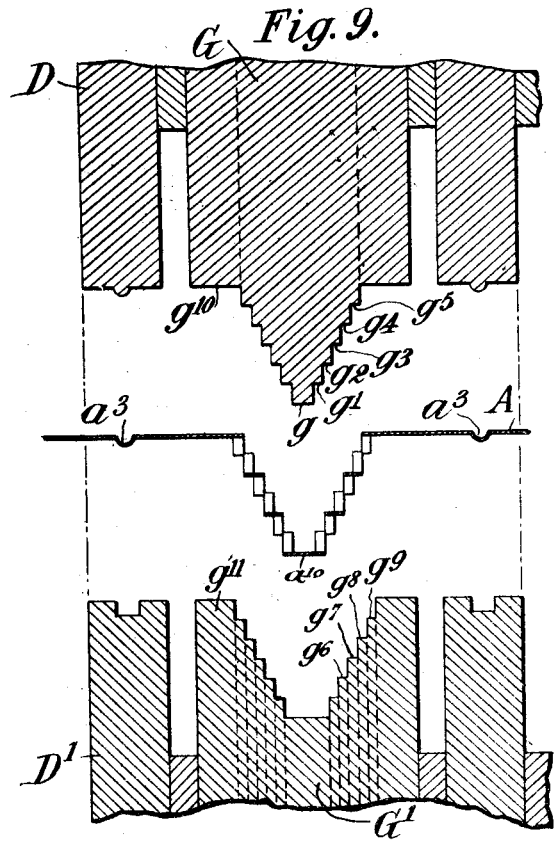
Fig. 9.
Fig. 11.
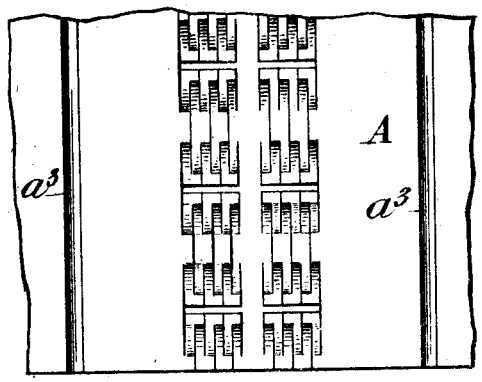
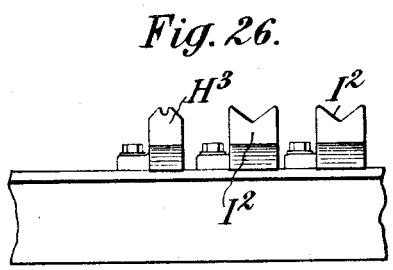
Fig. 26.
Fig. 10.
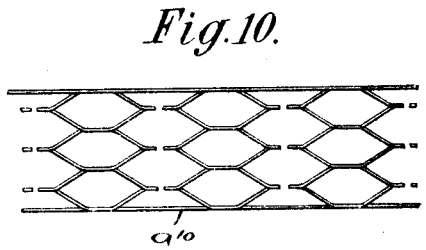
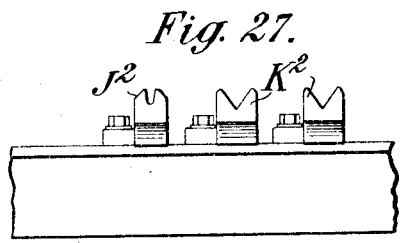
Fig. 27.
Fig. 28.
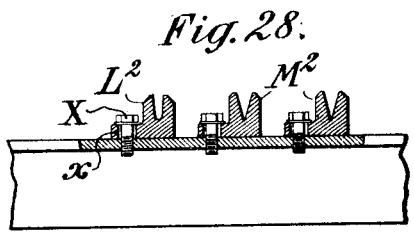
WITNESSES:
René Bruine
Fred White
INVENTORS:
John E. Dobson,
and Georg Merkel,
By Attorneys,
Fraser. Turk and Myers J. E. DOBSON & G. MERKEL.
MACHINE FOR PRODUCING EXPANDED METAL.
APPLICATION FILED DEC. 6, 1912.

1,119,933.

Patented Dec. 8, 1914.
7 SHEETS—SHEET 4.

WITNESSES:
René Buine
Fred White

INVENTORS:
John E. Dobson,
and Georg Merkel,
By Attorneys,
Fraser, Funk & Myers

J. E. DOBSON & G. MERKEL.
MACHINE FOR PRODUCING EXPANDED METAL.
APPLICATION FILED DEC. 6, 1912.

1,119,933.

Patented Dec. 8, 1914.
7 SHEETS—SHEET 5.

WITNESSES:
René Bruire
Fred White

INVENTORS:
John E. Dobson,
and Georg Merkel,
By Attorneys,
Fraser Trebt Myers

J. E. DOBSON & G. MERKEL.
MACHINE FOR PRODUCING EXPANDED METAL.
APPLICATION FILED DEC. 6, 1912.
1,119,933.
Patented Dec. 8, 1914.
7 SHEETS—SHEET 6.
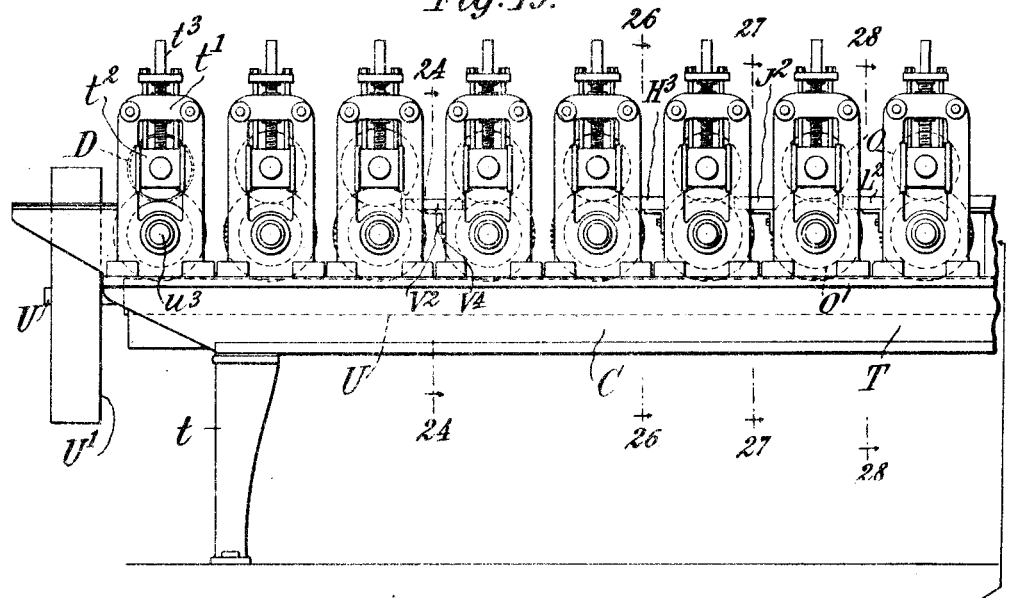
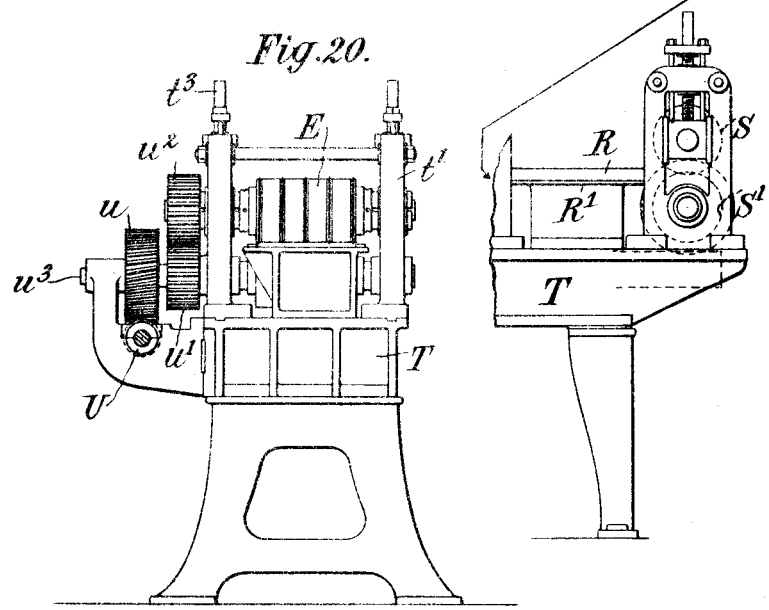
WITNESSES:
René Buine
Fred White
INVENTORS:
John E. Dobson,
Georg Merkel.
By Attorneys,
Fraser, Turk and Myers J. E. DOBSON & G. MERKEL.
MACHINE FOR PRODUCING EXPANDED METAL.
APPLICATION FILED DEC. 6, 1912.
1,119,933. Patented Dec. 8, 1914.
7 SHEETS—SHEET 7.
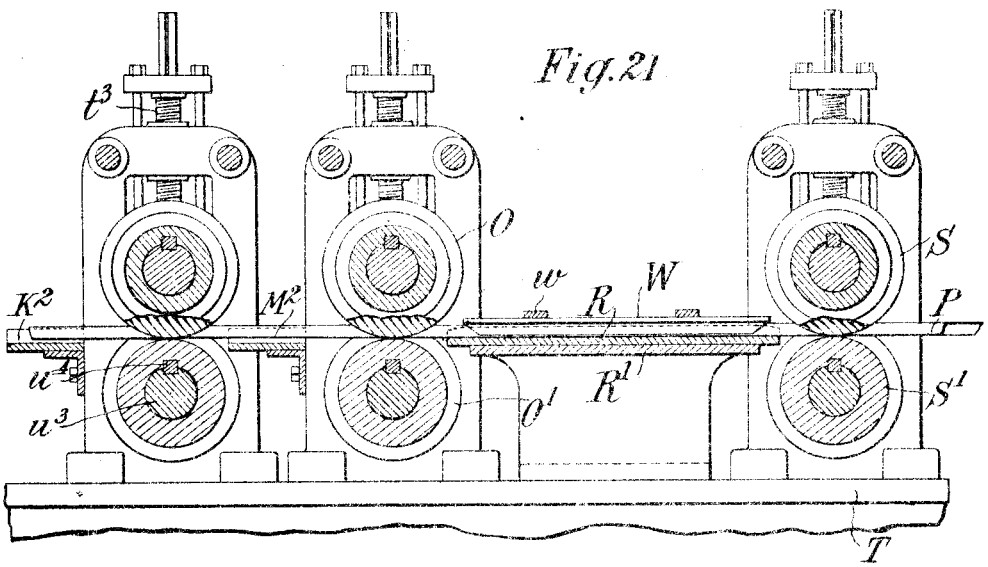
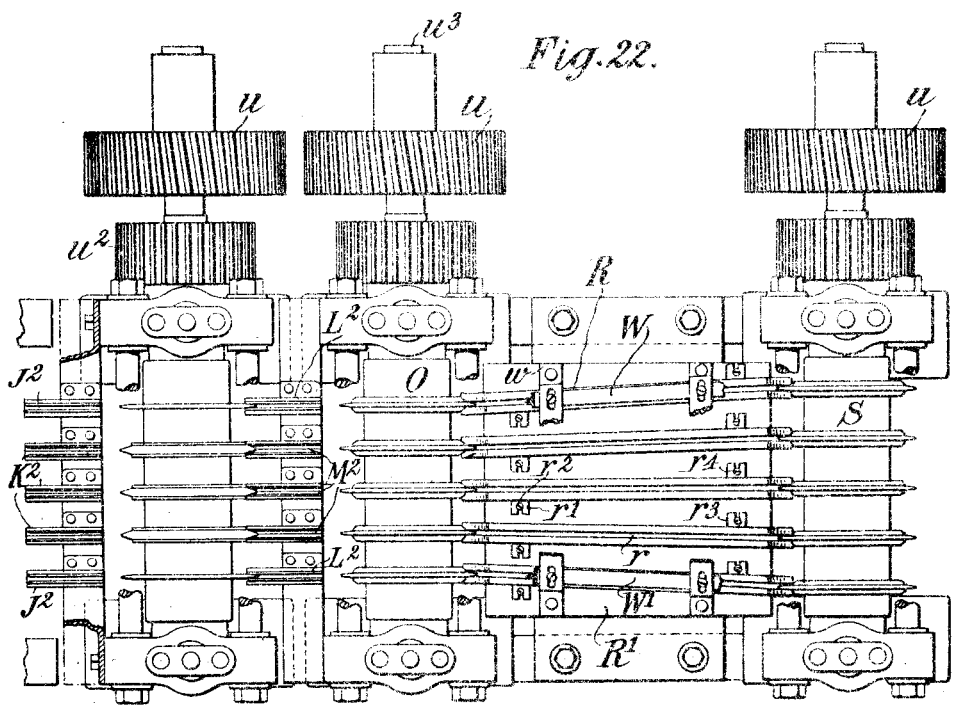
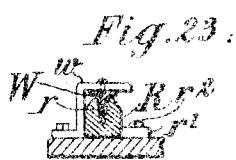

UNITED STATES PATENT OFFICE.

JOHN E. DOBSON, OF NEW YORK, N. Y., AND GEORG MERKEL, OF WEST HOBOKEN, NEW JERSEY, ASSIGNORS TO E. W. BLISS COMPANY, OF BROOKLYN, NEW YORK, A CORPORATION OF WEST VIRGINIA.

MACHINE FOR PRODUCING EXPANDED METAL.

1,119,933.     Specification of Letters Patent.     Patented Dec. 8, 1914.

Original application filed June 11, 1912, Serial No. 702,991. Divided and this application filed December 6, 1912. Serial No. 735,239.

*To all whom it may concern:*

Be it known that we, JOHN E. DOBSON, residing in the borough of Manhattan, city, county, and State of New York, and GEORG MERKEL, residing in West Hoboken, in the county of Hudson and State of New Jersey, both citizens of the United States, have invented certain new and useful Improvements in Machines for Producing Expanded Metal, of which the following is a specification.

Our invention relates to a machine for the production of expanded sheet metal and has for its object to produce a fabric of this nature having expanded portions which are separated by integral unexpanded or plane portions.

The invention forming the subject matter of this application is a division of an earlier application filed by us June 11th, 1912, Serial No. 702,991.

The partially expanded sheet produced by this machine may be employed for a variety of purposes, such for instance as the production of studdings, partitions, etc., and if desired it may have raised ribs formed therein by means embodied in the machine as illustrated.

Although the production of expanded sheet metal has been well developed, it has so far as we are aware prior to our invention not been possible to produce a sheet of such metal wherein a portion only thereof was expanded and the remainder was unexpanded, and the expanded part was of regular and uniform outline. The difficulty in the production of the article described consists in the difficulty of expanding the slitted sheet metal evenly, in preventing an undesired flow of the said metal, and in preventing a distortion thereof during the formation of the expanded part so that symmetrical and even figures are produced therein, and in expanding an interior portion of the integral sheet without affecting the adjoining unexpanded parts. While this expanded sheet metal may be made in other ways, the machine illustrated in this application is capable of satisfactorily producing said product in commercial quantities and at low cost. The said machine is fully illustrated in the drawings accompanying this application wherein:—

Figure 16:
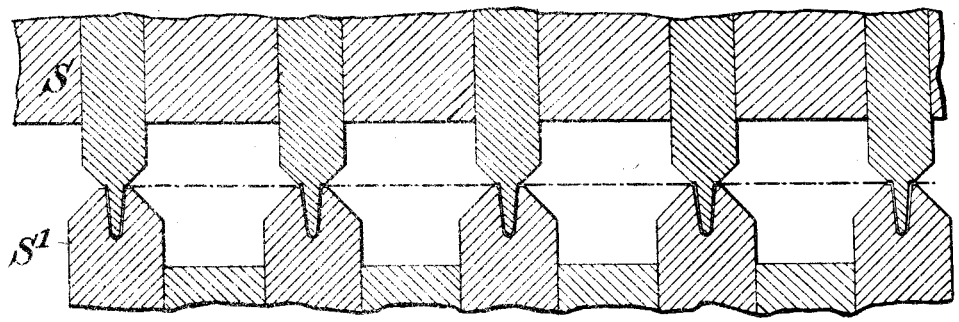
Figure 18:
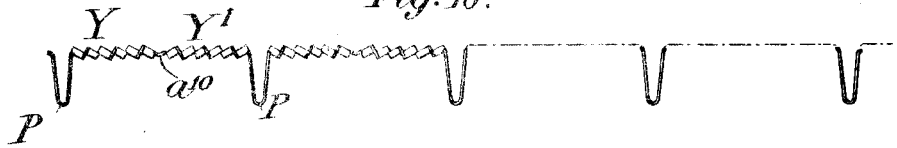
Figure 17:
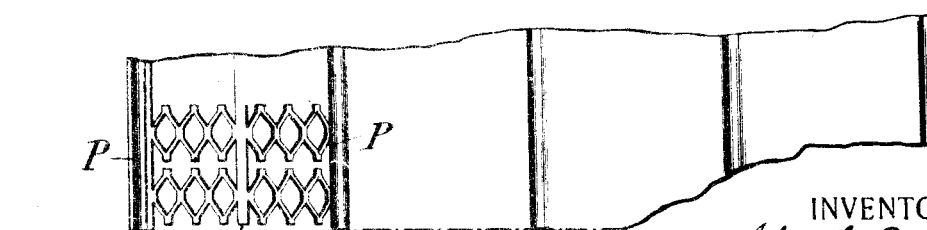

Figure 1 illustrates in plan view a piece of sheet metal slitted in places where it is to be expanded and ready to be operated upon by the said machine. Fig. 2 illustrates in detail view feeding and guiding rolls of said machine. Fig. 3 illustrates in section the first expanding rolls of our machine separated for convenience, together with the fabric as produced thereon. Figs. 4 and 5 are respectively a plan and side view of the fabric after treatment by the rolls of Fig. 3. Fig. 6 is a view similar to Fig. 3, illustrating the succeeding expanding rolls and a portion of the fabric produced thereby. Figs. 7 and 8 are side and plan views of the fabric as it leaves the rolls of Fig. 6. Fig. 9 is a view similar to Fig. 3, illustrating in cross section the final expanding rolls of our machine and also the fabric as it leaves such rolls. Figs. 10 and 11 are respectively a side elevation and a plan view of the fabric as it leaves the rolls of Fig. 9. Figs. 12 to 15 are views similar to Fig. 3 illustrating in cross section rolls of progressively varying size which may be employed to form longitudinal ribs in the fabric and to force the previously fully expanded parts of the sheet from the several planes into which they have been forced by expanding the same into one general and substantially the same plane. Fig. 16 illustrates feed rolls which may be employed to feed the completed fabric out of the machine. Figs. 17 and 18 illustrate in plan and end views the fabric produced by the said machine having longitudinal ribs. Fig. 19 is a side elevation of our improved machine. Fig. 20 is an end elevation thereof from the left-hand end of Fig. 19, the driving pulley being omitted. Fig. 21 is a detail longitudinal section of the right-hand end of the machine. Fig. 22 is a plan view of the parts illustrated in Fig. 21. Fig. 23 is a detail view of one of the widening guides in cross section. Figs. 24 and 25 are detail end and plan views respectively of center guides for guiding the partially expanded fabric from the rolls of Fig. 6 to those of Fig. 9. Fig. 26 is a detail end view of end and center guides for guiding the expanded fabric from the rolls of Fig. 12 to those of Fig. 13. Fig. 27 is a view similar to Fig. 26 of end and center guides for guiding the expanded fabric from the rolls of Fig. 13 to those of Fig. 14. Fig. 28 is a cross section on the line 28—28 of Fig. 19 of end and center guides for guiding the expanded fabric from the rolls of Fig. 14 to those of Fig. 15.

In our improved machine means are provided wherein a sheet of metal which has been previously slit at desired places is expanded at intervals, that is to say, the expanded parts of the metal are situated in longitudinal panels which are separated by intervening unexpanded plane parts, and in these unexpanded plane parts ribs may well be formed.

We have not illustrated as part of our machine the means whereby the metal is slitted, as machines for doing this are well-known, and this work may well be done in a separate machine. The slitted sheet when ready for treatment by our machine has slits formed therein, as illustrated in Fig. 1, and is likewise preferably provided with guiding ribs or beads $a^3$ whereby the sheet may be guided through the machine, and may be sheared in the slitting machine to the desired size. The slitting is preferably formed by cuts in the sheet, some of which are longitudinal and some of which are transverse cuts, whereby when the metal is separated or expanded it will be found that the figures are divided one from another longitudinally forming rows of figures which are connected at their lateral edges but wherein the figures in each row are separated from the figures in the next adjoining row. By this means the expansion of the metal causes the figures to pull away one from the other and obviates reduction in the size of the sheet and produces a symmetrical product. The slitted portions are arranged in panels or vanes longitudinally, and the metal between is the part in which the ribs may be formed if desired.

Our said machine comprises a series of successive dies illustrated as rolls, to the action of which the slitted metal is subjected and wherein the said metal is expanded a portion at a time while the adjoining metal is firmly held, and these dies both male and female have their operating faces smooth and even and without corrugations so that thereby no exact longitudinal register is required between the said faces at any particular part of the slitted portion, and the only register which is required is a lateral one which is provided by the beads $a^3$. The said successive expanding dies are illustrated in Figs. 3, 6, and 9 wherein they are lettered F F¹, V V¹ and G G¹. We have illustrated the employment of three sets of such expanding dies as a convenient number which is well adapted to produce the expanded portion illustrated in side view in Fig. 10 where three rows of figures are formed upon each side of the central strip $a^{10}$, but the invention is not necessarily concerned with the particular number of such expanding dies employed nor yet is it essential that such dies should expand only one complete figure at a time as illustrated. The number of such expanding dies may be varied and the amount which each shall engage may be varied. We have, however, produced the best results by causing each die to expand one row of figures. The expanded metal after it has left the final expanding dies of Fig. 9 has a shape in cross section illustrated in section in said figure, and the expanded part is then in substantially a trough-like form. The said expanded metal fabric produced by these successive bending operations is then preferably treated so that the fully expanded slitted parts of the sheet are forced from the several planes into which they had been forced by expanding the same into one general and substantially the same plane. For this purpose a series of pressing dies in the form of rollers of progressively increasing size is employed whereby the said expanded portion is gradually forced into the desired plane. These dies are illustrated in Figs. 12, 13, 14 and 15 where they are lettered H² j² N and N¹. During the operation of the said pressing rollers another series of dies preferably likewise in the form of rollers of progressively increasing size act upon the unslitted portions of the metal sheet and change the same from a flat sheet in one plane to a sheet having U-shaped ribs which extend longitudinally of the unslitted portion, and these ribs are produced by the action of the forming dies which are illustrated in Figs. 12 to 16 and are there lettered H H¹ I I¹, J J¹ K K¹, L L¹ M M¹, O O¹ O² O³, and S S¹. By said dies longitudinal ribs lettered P in Fig. 18 are produced and during the formation thereof the edges of the unslitted portion of the sheet are caused to approach one another whereby space is provided which is required to accommodate the slitted portion of the sheet when expanded, and when occupying one plane instead of the several planes into which it has been forced during the process of expansion. The forcing of the slitted and expanded portions of the sheets into one plane depends wholly upon the action of the pressing dies and during such action no further expansion of said slitted portion over that which has already taken place by the forcing of said slitted portion of the sheet into several planes as aforesaid occurs. The machine as illustrated likewise embodies means whereby the ribs may be further separated causing a widening of the expanded metal fabric.

A further and detailed description of the machine and its operation will now be provided, and in order that the same may be clearly understood we have illustrated in Fig. 1 a sheet of the fabric as beaded and slitted preparatory to treatment by this machine. This sheet which as a whole is lettered A has plane or unslitted portions B and slitted portions or panels $A^1$. The expanded part of the fabric when completed has a series of diamond-shaped figures which lie in transverse and longitudinal rows. The transverse rows are connected at their sides and at their ends they are separated from the figures comprising the adjoining row. The slitted sheet as illustrated in Fig. 1 has longitudinal cuts $a$ which are staggered relatively to one another, which cuts form the longitudinal edges of the diamond-shaped figures. A short unslitted space $a^6$ is left between alined cuts $a$ and this space forms the connection between adjacent figures in the transverse rows. Transverse cuts $a^1$ separate the diamond-shaped figures one from the other longitudinally. A strengthening longitudinal rib $a^{10}$ which is left unslit is substantially in the center of the slitted panel $A^1$ and is connected to the slitted figures by connecting portions $a^9$. It will be observed that the slits $a$ $a^1$ produce figures such for instance as the one lettered $a^2$ which is connected at its sides to the adjoining figures by connecting portions $a^6$ but disconnected at its ends and all other parts. The particular outline of the figures is not essential nor the manner of forming the slits. This strip so slitted is ready for treatment by our improved machine which as a whole is lettered C. This machine has nine series of rollers to the action of which the fabric A is subjected in the machine. Of these the first are feed rolls and the second to eighth inclusive are operating rolls. The sheet A is fed to the rotary male and female gage rollers D $D^1$ which as illustrated in Fig. 2 are formed with male and female guides $d$ $d^1$. These guides enter the guiding ribs $a^3$ and hold the sheet in place. Upon the same shaft with the rolls D $D^1$ are body rolls E $E^1$ which serve to feed the fabric to the subsequent rolls and to straighten the same. From the feed rolls of Fig. 2 the fabric A is next fed to the second series of rolls which perform the first step in expanding the slitted metal. The said expanding rolls are illustrated in Fig. 3 in cross section where they are shown separated for convenience and are there lettered F $F^1$. The fabric is guided to the said rolls by rolls D $D^1$ upon the same shaft, which are duplicates of the previous rolls D $D^1$. These expanding rolls F $F^1$ are provided upon their peripheries with concentric stepped expanding dies which are not corrugated but are smooth and even in contour and are adapted to engage one row of diamond-shaped figures upon each side and to expand the same.

The male die F has steps $f$ $f^2$ which are connected by risers $f^6$ $f^8$ and the female die $F^1$ has corresponding counter steps $f^1$ $f^3$ which are connected by risers $f^7$ $f^9$. The dies F $F^1$ are adapted to grip the unslitted portion B of the fabric between faces $f^4$ $f^5$ adjacent the slits and to hold the said fabric against lateral movement. The male die faces $f^2$ are adapted to engage the rows $a^4$ of Fig. 1 and to press the same, thereby expanding the outer row of diamond-shaped figures on each side. The outer frames $a^7$ will then lie in the space between the vertical die surfaces $f^6$ $f^7$. Pressure of die $f^2$ upon the part of end portions $a^5$ which it engages will press the same down and cause a part of said portion $a^5$ which is engaged by the die $f^2$ to be forced down upon female die face $f^3$. This will cause the side $a^8$ which connects end portions $a^5$ and side portions $a^6$ to be inclined relatively to said parts, as indicated in Fig. 5. Male die face $f$ will likewise engage such parts of the slitted portion of the fabric as is between the outer longitudinal rows $a^4$ of diamond-shaped figures and will force the same down to female die face $f^1$, and the side frames $a^9$ which lie in the row $a^4$ and connect ends $a^5$ to sides $a^6$ will lie between the vertical die surfaces $f^8$ $f^9$ and will be inclined relatively thereto. The action of these expanding dies F $F^1$ as above explained will expand the outer row of diamond-shaped figures at each edge of the slitted part, as indicated in Fig. 5, and this result is accomplished without any distortion by reason of the transverse cut $a^1$ which permits the drawing apart of adjacent portions $a^5$, leaving a space $a^{17}$ (Fig. 5). A second series of expanding dies likewise in the form of male and female die rolls V $V^1$ is illustrated in Fig. 6. These are likewise provided with gage rolls D $D^1$ as heretofore and these die rolls are constructed similar to those of Fig. 3, but have an additional series of steps whereby they are adapted to expand an additional row of slitted figures adjacent to those expanded in the dies of Fig. 3. Said dies are provided with faces $v$ $v^1$ which gage the unslitted part B of the fabric A and hold the same against movement. Male die faces $v^2$ $v^3$ coöperating with female die faces $v^4$ $v^5$ are similar to the corresponding faces of the first expanding dies of Fig. 3 and engage the first row of diamond-shaped figures expanded by those dies and hold the same. The second expanding dies are further provided with male die faces $v^6$ $v^7$ which engage the portions $a^5$ $a^6$ of the next inner diamond-shaped rows of figures on each side and depress the same against corresponding female die faces $v^8$ $v^9$, thereby still further expanding the fabric so that two rows of expanded diamond-shaped figures appear on each side as seen in side view of Fig. 4. From the second expanding rolls of Fig. 8 the partially expanded fabric is guided to another series of rolls G G¹ which in the particular machine illustrated are the third and final series of expanding rolls. Gage rolls D D¹ are provided as before to support and guide the fabric. These rolls have male and female die-faces $p^2$ to $p^5$ which engage the expanded fabric at places corresponding to those engaged by die faces $p$ to $p^1$ inclusive of the second expanding dies, and assist in holding the fabric which is also firmly held by faces $q^{10}$ $q^{11}$ on the male and female die rolls. While the fabric is so held the male die faces $q$ $q^1$ with which the male die is equipped by coöperation with corresponding female die faces expand the remainder of the slitted part of the metal fabric and in a manner corresponding to the action of dies F F¹ by bending the same down, as appears from side view of Fig. 10 and from cross section of Fig. 9. From it will be seen that the slitted part of the metal has been expanded until in a transverse cross section a substantially trough-shaped part having substantially the outline of a V wherein the side connecting portions as well as the end portions where in plates substantially parallel with the plane of the unslitted portion of the fabric. The operation of expanding the slitted portion is then complete and the fabric is ready for use in such condition if desired, or it may have the expanded portion pressed into the plane of the unslitted portion. We prefer to guide the fabric in its passage between the second and third expanding dies and accordingly such guide is provided and is situated between the dies V V¹ and the dies G G¹. These guides are so called center guides and are adapted to guide the trough shaped portion produced by the dies V V¹ which guides are shown in perspective in Figs. 24 and 25 and comprise longitudinal guides V² which have guide channels V³ that conform substantially to the shape of dies V V¹ and are adapted to receive the expanded metal fabric after it leaves the dies V V¹ and to guide the same to the succeeding rolls G G¹. The guides V² are adjustably mounted upon angle irons V⁴ which are supported on the machine frame.

Means are provided whereby the fully expanded slitted portions of the sheet are forced from the several planes into which they have been forced in expanding the same to one general and substantially the same plane, and such means comprise a series of pressing dies which successively press the said slitted and expanded metal into the plane of the unslitted section and the space required for the expanded metal so forced into said plane is produced by the action of a series of dies whereby the unslitted metal is formed into a series of longitudinal ribs.

The expanded metal fabric as it leaves the final expanding dies illustrated in Fig. 9 has the shape in cross section illustrated in said Fig. 9 and in side view as illustrated in Fig. 10. This fabric is passed to the rolls illustrated in Fig. 12 where a series of pressing rolls H² engage the apex of the V-shaped expanded metal and force the same toward the plane of the unexpanded portion. During this operation rotary rib forming dies H H¹ engage the sheet for the purpose of disposing of the metal produced by the action of the presser die H². The die H has a die face h which enters the bead $a^1$ in the fabric and forces the same into a correspondingly shaped female die face in the die H¹. These dies are deeper than the dies d d¹ with which the preceding gage rolls D D¹ are equipped, and accordingly deep shapes the rib $a^1$. Upon the same shafts which carry the dies H H¹ are male and female rib forming dies I I¹. These dies are the first of a series of progressively deepening rib forming dies and they have die faces adapted to form a shallow groove in the plane or unslitted panels B of the fabric.

The fabric after leaving the rolls of Fig. 12 is guided to the next succeeding rolls by outside guides H⁴ which are illustrated in Fig. 26 and which receives the rib h and by center guides I² which receive the rib i in the fabric and serve to guide the same and center the same for the following rows. These guides are similarly supported and adjustable as are the previous guides. From the rolls of Fig. 12 the fabric so guided passes to the rolls of Fig. 13 where a second series of presser rolls $j^2$ are provided. These rolls are annular revolving rolls similar to H² but have their pressing faces farther outward whereby in operation they serve to further force the expanded metal fabric toward the plane of the unslitted parts. Rolls J J¹ serve to take care of the surplus metal produced by the action of the said presser rolls by deepening the outside ribs as seen at j. Rotary center rolls K K¹ which have die faces at a more acute angle than those of Fig. 12 serve to deepen the rib i in the intermediate unslitted portions of the fabric. The fabric is then guided to the next succeeding rolls by guides J² K² illustrated in Fig. 27 which are similar to those of Fig. 26 but have guiding faces corresponding to the shapes produced by the rolls of Fig. 13, and these guide the fabric to the rolls of Fig. 14. Here are provided rotary presser dies N which still further press the slitted portion toward the plane of the unslitted portion and where the space required for this purpose is produced by the action of rib forming dies L L¹ and M M¹ where such action serves still further to deepen the side ribs l and the center ribs m of the fabric. In the rolls L L¹ the outside ribs l are finished, whereas the ribs m are at the proper depth but are wider than is desired.

Figure 14:
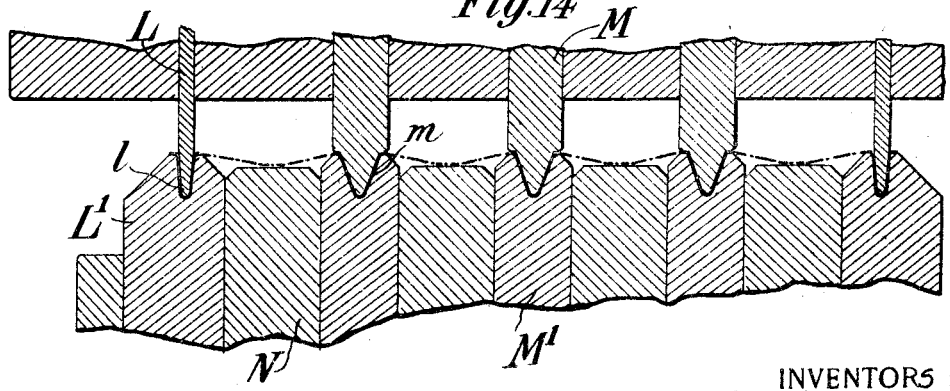
Figure 15:
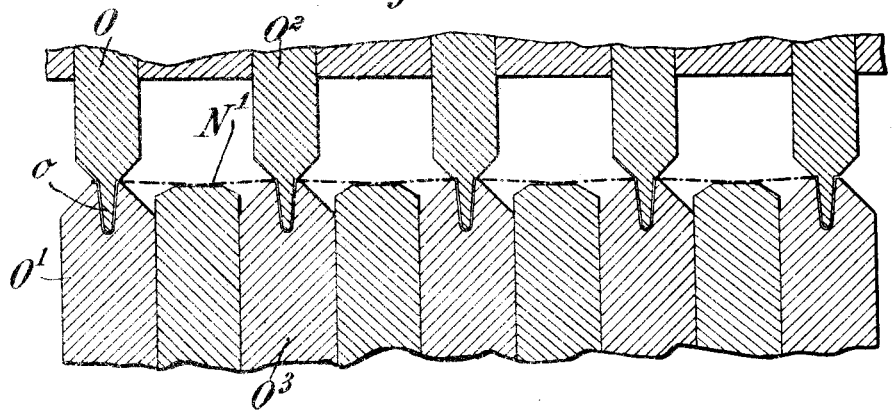

We also provide guides for guiding the fabric from the rolls of Fig. 14 to those of Fig. 15 and such guides are illustrated in Fig. 28 and comprise side or end guides L² and center guides M² which are similarly supported to those heretofore described. In Fig. 15 rotary presser rolls N¹ press the expanded portion of the fabric to substantially the plane of the unslitted portion. Here also are provided male and female rolls O O¹ which are the size of rolls L L¹ and enter the ribs o. Center rotary die rolls O² O³ shape the center ribs to final form.

The guides V² illustrated in Figs. 24 and 25 are mounted upon angle irons V⁴ which are supported upon the side of the frames t¹, as seen in Fig. 24, and also in Fig. 19. The guides H² I² of Fig. 26, also the guides J² K² of Fig. 27 and the guides L² M² of Fig. 28 are similarly supported and these guides are all provided with means for adjusting them for various dimensions of expanded metal. Such means as illustrated comprise set screws X which pass through slots x in the extended base of the said guides and engage in the top of the angle irons V⁴.

The said machine as illustrated and described down to and including the action of rolls of Fig. 15 which press the expanded and unslitted portion to the plane of the unexpanded portion and complete the formation of the longitudinal ribs therein is capable of producing a commercial and practical expanded metal fabric. It may be desired, however, to widen this fabric by separating the ribs lettered P in Fig. 18, whereby the area of the expanded metal will be increased without diminishing its utility. Our machine is equipped with means whereby this result may be accomplished. Such means are illustrated in Figs. 21 to 23 and comprise a series of guides R adjustably mounted upon a fixed part of the machine and located between the rolls O and the final discharge rolls S. These guides lie in the plane of the movement of the fabric and diverge toward the discharge end of the machine. There are as many guides R as there are ribs P, and each guide R is provided with a guiding channel r which is adapted to receive one of the said ribs P, and as the fabric is fed through the said guides R the ribs P are stretched apart equal to the distance which the said guides R converge. The ribs P are tightly held in the channels r by means of stationary presser bars W W¹ which are situated relatively to guiding channels r and are located each in one of the guides R where they are held by brackets w. By means of these guides the fabric is widened and the expanded part thereof is stretched. The guides R are mounted upon the support R¹ secured to the bed T and are adjustable by slotted brackets r¹ through which pass screws r² tapped into a fixed part of the machine. A similar means of supporting presser bars W permits them to be correspondingly adjusted. From these widening guides the fabric then passes between the rolls S S¹ (Fig. 16) which have male and female die faces corresponding in depth to the ribs P. These dies S S¹ serve to discharge the fabric from the machine and the fabric as it emerges from said dies has the shape in cross section illustrated in Fig. 18 and the outline of expanded figures indicated in Fig. 17. The particular details of construction and operation of our said machine are not of importance. They may be varied a number of ways without departing from our invention. We will, however, describe the construction as illustrated.

The machine as a whole is designated C. It comprises a bed or base portion T upon which the rollers and guides are mounted, and this bed is conveniently supported as upon legs t. Upon the upper part of said bed are located at each side of the machine frames t¹ which are arranged in oppositely located pairs and serve to support the roller bearing shafts. The shafts for the upper rolls are vertically adjustable and for this purpose are journaled in blocks t² which slide in said frame t¹ and are adjusted by threaded posts t³ which are mounted in said frame. The shafts u⁵ which carry the lower rolls are revolved from a longitudinal worm U (Fig. 20). Upon the end of this worm is fixed a driving pulley U¹ (Fig. 19). This worm U engages a worm gear u upon each of the shafts u⁵ of the lower rolls and serves to convey motion thereto. Gears u¹ u² upon the lower and upper roller carrying shafts respectively connect the upper and lower rolls in each pair so that all the rolls are revolved in unison. Keys u⁴ connect the lower rolls to their shafts u⁵ and corresponding keys connect the upper rolls in the same manner.

In Figs. 1 to 11 we have illustrated the parts full size, whereas in Figs. 12 to 18 they are only about half this size, and Figs. 19 to 28 are not drawn to particular scale. It will be observed that the expanded metal is produced by means of dies which first engage the outer slitted rows of each part and progress toward the center. This is due to the fact that in the particular slitting machine used the burs upon the slits are so produced that the slitted metal was best adapted for expansion in this manner. It is not to be understood, however, that the dies must necessarily be constructed to produce this particular arrangement, as it is not essential that the dies should be so constructed as that the expansion shall begin upon the outer part of the slitting portion.

It will be perceived from the foregoing that our invention is not necessarily concerned with the particular shape, construction or method of operation of the mechanical elements employed, as the same may be changed within the limits of the appended claims.

That we claim is:—

1. A machine for producing expanded sheet metal comprising a series of progressively deepening, stepped, expanding dies, holding devices for each of said expanding dies adapted to prevent lateral movement of the sheet, and a series of progressively higher presser dies.

2. A machine for producing expanded sheet metal comprising a series of progressively deepening, rotary, stepped expanding dies, rotary ribbed holding rolls for each of said expanding dies, and a series of progressively higher rotary presser dies.

3. A machine for producing expanded sheet metal comprising an expanding die having oppositely disposed stepped die faces and an intermediate plane portion, a second expanding die similarly constructed but having additional die faces on each side, a third expanding die having oppositely disposed stepped die faces on each side and substantially V-shaped in cross-section, and guides between said second and third expanding dies.

4. A machine for producing expanded sheet metal comprising a rotary expanding die having oppositely disposed stepped die faces and an intermediate plane portion, a second rotary expanding die similarly constructed but having additional die faces on each side, a third rotary expanding die having oppositely disposed stepped die faces on each side and substantially V-shaped in cross-section, and guides between said second and third expanding dies.

5. A machine for producing expanded sheet metal comprising an expanding die having oppositely disposed stepped die faces and an intermediate plane portion, a second expanding die similarly constructed but having additional die faces on each side, a third expanding die having oppositely disposed stepped die faces on each side and substantially V-shaped in cross-section, and guides between said second and third expanding dies, a series of presser dies of progressively increasing height, and guides between said presser dies.

6. A machine for producing expanded sheet metal comprising a series of stepped expanding dies having a progressively increasing number of stepped die faces, each of said series comprising a plurality of similarly shaped parallel dies, and ribbed holding devices located between adjoining parallel dies.

7. A machine for producing expanded sheet metal comprising a series of stepped, rotary expanding dies having a progressively increasing number of stepped die faces, each of said series comprising a plurality of similarly shaped parallel dies, and a common shaft for said parallel dies, and rotary ribbed holding rolls on each of said shafts between said expanding dies.

8. A machine for producing expanded sheet metal comprising a series of stepped, rotary expanding dies having a progressively increasing number of stepped die faces, each stepped die having an even die face, each of said series comprising a plurality of similarly shaped dies and rotary ribbed holding dies located in lines between the lines of said successive expanding dies.

9. A machine for producing expanded sheet metal comprising a series of stepped, rotary expanding dies having a progressively increasing number of stepped die faces, each of said series comprising a plurality of similarly shaped dies, and rotary ribbed holding dies adapted to grip the sheet between adjoining dies to prevent lateral movement during the action of the expanding dies, and a series of presser rolls of progressively increasing height.

10. A machine for producing expanded sheet metal comprising a series of stepped, rotary expanding dies having a progressively increasing number of stepped die faces, a series of presser rolls of progressively increasing height, and a series of rotary male and female rib forming dies of progressively increasing size, for operating with said presser rolls and adapted to press a portion of the metal displaced by the action of said presser rolls into longitudinal ribs.

11. A machine for producing expanded sheet metal comprising a plurality of successively acting rotary male and female expanding dies, each having oppositely disposed, stepped die faces, succeeding dies having a progressively increasing number of stepped die faces.

12. A machine for producing expanded sheet metal comprising a plurality of successively acting rotary male and female expanding dies, each having oppositely disposed, stepped die faces, succeeding dies having a progressively increasing number of stepped die faces, each of said dies adapted to engage opposite sides of the sheet to be expanded and to coincidently expand both sides thereof.

13. A machine for producing expanded sheet metal comprising a plurality of successively acting, rotary, expanding dies, having oppositely disposed, stepped die faces, succeeding dies having a progressively increasing number of stepped die faces, and each of said stepped dies having an even and continuous die face.

14. A machine for producing expanded sheet metal comprising a plurality of successively acting rotary male and female expanding dies, each having oppositely disposed stepped die faces, succeeding dies having a progressively increasing number of stepped die faces, adapted to expand a sheet at intervals, and to give said expanded part a form substantially V-shaped in cross-section, and a series of presser rolls of progressively increasing height adapted to progressively press said expanded part to a plane substantially level with the base thereof.

15. A machine for producing expanded sheet metal comprising a plurality of successively acting expanding dies, having oppositely disposed, stepped die faces, succeeding dies having a progressively increasing number of stepped die faces, adapted to expand a sheet at intervals, and to give said expanded part a form substantially V-shaped in cross-section, a series of presser rolls of progressively increasing height adapted to progressively press said expanded part to a plane substantially level with the base thereof, and a series of rotary male and female rib forming dies of progressively increasing size, coöperating with said presser rolls and adapted to press a portion of the unexpanded part of said sheet displaced by the action of said presser rolls into longitudinal ribs.

16. An expanding machine comprising a device for opening out previously slitted sheets transversely to the plane thereof and means for forming ribs between said slitted portions of said sheets and thereby bringing said slitted portions into substantial alinement.

17. A machine for forming ribbed expanded metal comprising means for opening out previously slitted portions transversely to the plane of the sheet, means for forming ribs between said slitted portions and means acting simultaneously with said ribbing means for pressing the slitted portions back into substantial alinement.

In witness whereof, we have hereunto signed our names in the presence of two subscribing witnesses.

JOHN E. DOBSON.
GEORG MERKEL.

Witnesses:
  ELI E. RIDHEAD,
  FRED'K C. FLADD.